United States Patent [19]

Wiggins

[11] 4,220,432

[45] Sep. 2, 1980

[54] PART GAGING CONTROL FOR LIQUID SEAL SYSTEM

[75] Inventor: Richard F. Wiggins, Fairfield, Conn.

[73] Assignee: Gyromat Corp., Bridgeport, Conn.

[21] Appl. No.: 921,472

[22] Filed: Jul. 3, 1978

Related U.S. Application Data

[62] Division of Ser. No. 672,848, Apr. 2, 1976, Pat. No. 4,108,105.

[51] Int. Cl.$^2$ .............................................. B65G 49/00

[52] U.S. Cl. .......................................... 414/287; 49/25

[58] Field of Search ........................ 414/150, 153–155, 414/217, 287; 432/53, 56, 242; 49/25, 29, 30, 68, 69, 168; 118/668

[56] References Cited

U.S. PATENT DOCUMENTS

| | | | |
|---|---|---|---|
| 712,139 | 10/1902 | Johnson | 49/168 X |
| 3,122,243 | 2/1964 | Hawley | 414/155 X |
| 3,777,702 | 12/1973 | Fitzgerald | 118/668 |

*Primary Examiner*—Robert G. Sheridan

*Attorney, Agent, or Firm*—Mandeville and Schweitzer

[57] ABSTRACT

The disclosure relates to a paint spray system and specifically to a novel part gaging apparatus and spray head positioning system. The paint spray system comprises a spray housing, conveyor means to transport a workpiece to be painted through the housing, and spray head means mounted on a movable positioner adjacent the housing and extending into the interior of the spray housing. The part gaging apparatus includes a part sensing element positioned adjacent to the conveyor means and displaceable to contact a workpiece being conveyed to the spray housing. The part sensing element is mechanically connected to a position memory apparatus and operates the position memory apparatus in accordance with the distance the part sensing element is displaced. The displacement information is appropriately related to the width of the workpiece and establishes the proper forward position to be occupied by the spray heads of the coating system.

The spray housing is also provided with an automatic exit door arrangement and control. When the conveying means conveys the workpiece to the exit door arrangement, the door control will open the exit doors in accordance with the displacement information, whereby the width and height of the exit door opening will correspond with the workpiece size and shape.

7 Claims, 7 Drawing Figures

PART GAGING CONTROL FOR LIQUID SEAL SYSTEM

This is a division of application Ser. No. 672,848, filed Apr. 2, 1976, now U.S. Pat. No. 4,108,105.

BACKGROUND AND SUMMARY OF THE INVENTION

Spray painting of irregularly shaped articles by automatic production means often presents a problem in achieving an adequately uniform coating of the workpiece surfaces. Whether utilizing electrostatic or non-electrostatic spray coating techniques, the automatic spray coating of a part having a variety of surface exposures conventionally may require a complex initial setup of the spray heads, to direct spray from various angles and in various directions, in order to be assured of applying coating material to all of the surface exposures.

A unique and improved new method and apparatus for achieving a highly satisfactory spray coating of irregular workpieces is disclosed in the co-pending Application of Richard F. Wiggins, Ser. No. 637,019, filed Dec. 2, 1975, now U.S Pat. No. 4,042,734 and owned by the Gyromat Corporation. The invention of the earlier application enables efficient coating of workpieces of extremely large sizes, having surface areas exposed along various axes. Pursuant to the teachings of the earlier application, one or more spray heads are mounted for rotary movement about a predetermined axis. The spray head or heads are in turn disposed at a substantial angle to the rotational axis (typically around 45°) such that, when the spray heads are rotated about a horizontal axis (for example) the spray fans emanating from the spray heads will, at one time or another, traverse most surfaces which are either in front of, above or below, or to either side of the rotating spray heads. In an automatic spray coating line, the workpiece to be coated is conveyed through a spray housing past a coating station at which the rotating spray heads are located. The spray heads are reciprocated more or less at right angles to the path or axis along which the workpiece is conveyed, so that the rotating nozzles sweep the work from end to end and also from top to bottom.

In a paint spray system such as described above, the proper positioning of the spray heads adjacent the workpiece is important to insure an even and uniform application of the spray. Typically, workpieces of varying width are mounted on the conveyor in no particular order. To accommodate the various pieces, the spray heads are mounted on a positioner so that they may be moved along a line perpendicular to the plane defined by the workpiece and positioned at a point optimum for spraying the particular piece.

The present invention relates to a unique, automatic part gaging and spray head positioning system operative to sense the configuration of an incoming part and position the spray heads accordingly. The new system is most advantageously used in conjunction with the aforementioned Wiggins application. However, the invention is not exclusively limited to such utilization, as will appear.

In accordance with one aspect of the invention, a part sensing element is positioned adjacent the conveyor, shortly in advance of the entrance door of the spray coating chamber, and is connected to a position memory apparatus. As a workpiece approaches the coating chamber, the sensing element is laterally displaced to make contact with the incoming workpiece, and the position memory apparatus functions to translate such lateral displacement into part width information, which is stored in a storage memory. The stored information is then utilized to control the spray head positioner to place the spray heads at an optimum distance from the particular workpiece during the coating operation.

In the illustrated form of the invention, the sensing element is connected to a limit switch apparatus and a double-acting actuator. A workpiece approaching the coating chamber activates the forward drive of the actuator to displace the sensing element towards the workpiece. The displacement of the sensing element will operate the limit switch apparatus in accordance with the distance the sensing element is displaced. The limit switch apparatus is electrically connected to a storage memory which retains the part shape information thus derived for utilization at the appropriate times.

A novel electrical control means is provided to operate the spray head positioner to properly position the spray heads in accordance with the information stored in the above described part gaging cycle. In the illustrated forms of the invention, the control means is energized to operate a power drive means in a reverse mode to retract the positioner to a home position. Upon coming to the home position, the control means is activated to start a forward mode of the power drive means to move the positioner toward the region to be occupied by the incoming workpiece and stop the power drive means when the positioner is positioned in accordance with the stored information. Desireably, the electrical control circuit is provided with a workpiece width comparison circuit to defeat repositioning of the reciprocator if the width of a new incoming workpiece is the same as the workpiece previously gaged.

In accordance with another feature of the present invention, the spray housing is provided with an automatic exit door arrangement. An actuator means is mechanically linked to the exit door arrangement and operationally connected to multiple delay timer means. The delay timer means can be activated at appropriate times in the part gaging and reciprocator positioning cycles and arranged to have a first time-out, when the conveyor means has transported the workpiece to the exit door arrangement, and a second time-out, when the workpiece has been transported through and beyond the exit door arrangement.

In the illustrated form of the invention, the exit door arrangement comprises two, opposed outwardly opening doors. Each of the opposed doors is of the "Dutch" door type and an actuator is mechanically linked to the upper portion of each door. If a small workpiece is about to exit, only the upper portions of the doors are opened by the actuator means. A sensing device, positioned adjacent the entrance of the spray housing, is activated by a workpiece that is higher than the upper portions of the exit doors. This will actuate a latch means to lock the bottom portions of the exit doors to the upper portions. Operation of the actuator means will now open both portions of the exit doors.

For a better understanding of the above and other features and advantages of the invention, reference should be made to the following detailed description and to the accompanying drawings.

DETAILED DESCRIPTION OF THE PREFERRED EMBODIMENT

I. General Description of the Paint Spray System and Part Gaging Apparatus

Figure 1:
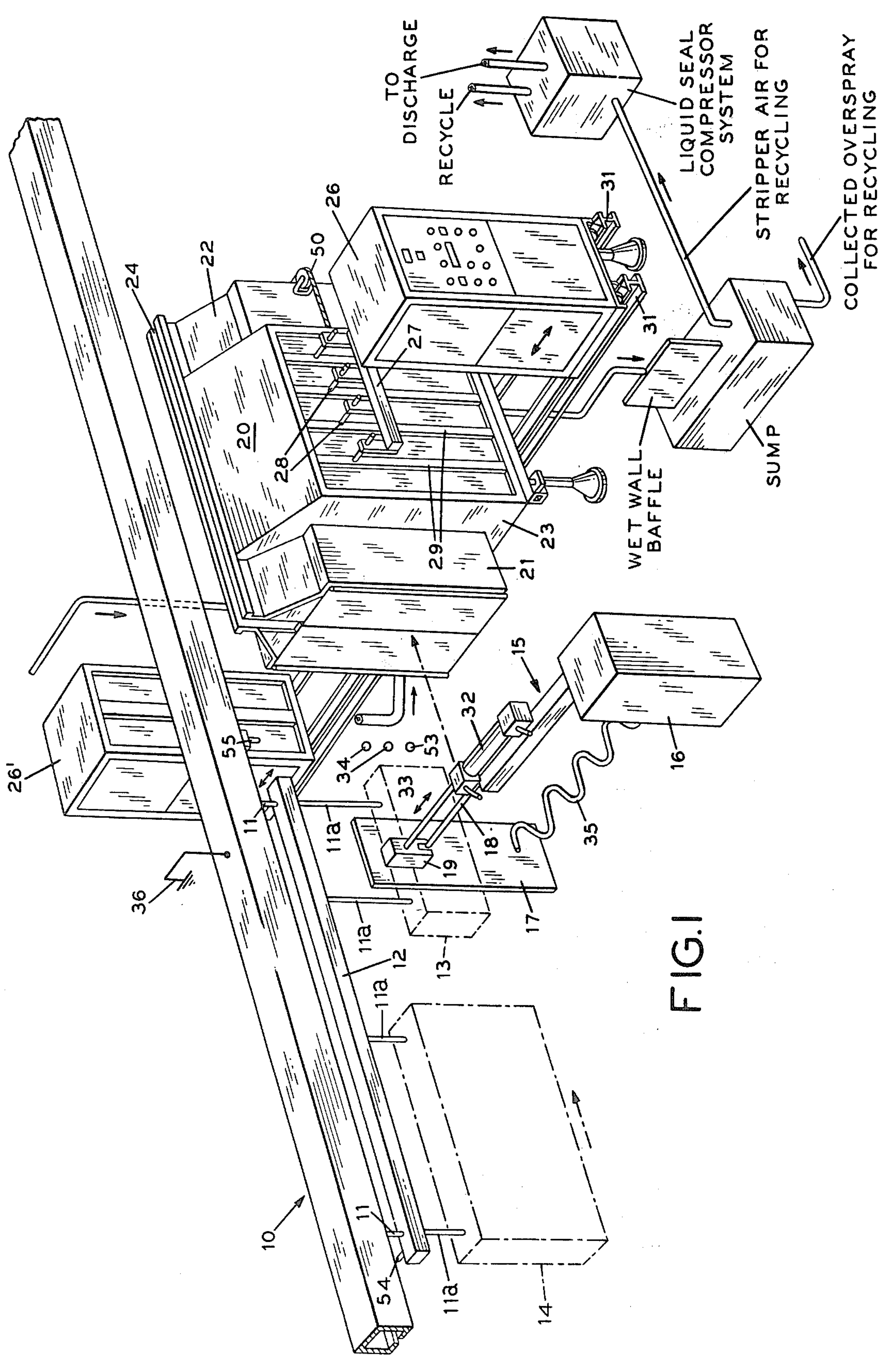
FIGS. 1 and 1*a* are simplified perspective views of a conveyorized spray coating system incorporating features of the present invention.

Referring now to the drawings, FIG. 1 illustrates a typical commercial paint spray line incorporating the principles of the invention. An overhead conveyor, generally designated by the reference numeral 10, is arranged to receive hangers 11 from which are suspended load bars 12 adapted to support workpieces 13, 14 to be painted by means of hanger elements 11*a*. It is assumed that the workpieces 13, 14 may be of non-uniform configuration and vary in their width dimensions. The workpieces 13, 14 are arranged so that the widest portion of the widest workpieces forms the leading edge of the supported workpieces 13, 14.

A spray housing 20 is provided along the conveyor path, and it most advantageously includes an entrance vestibule 21, an exit vestibule 22 and a spray application chamber 23. In its generalities, the spray housing 20 is constructed in accordance with the principles indicated in the E. O. Norris U.S. Pat. No. 2,848,353, the disclosure of which is made a part hereof by reference. In the beforementioned E. O. Norris patent, the spray chamber is provided in its lower portion with a sump, which collects all of the liquid overspray draining down the chamber walls. The drainage flow from the sump is through a baffle-like structure, which also constitutes the sole or primary air discharge path from the chamber. The spray coating material is introduced into the chamber by means of air atomizing spray guns, such that substantial quantities of air are being introduced into the chamber continuously during a spray coating operation. By means of a suction device, connected through the baffled sump passages, all of this air is drawn out of the spray chamber, through the baffled sump, whose surfaces are wet with the outflowing liquid overspray. The spray mist, contained in the outgoing air, is caused to contact the wet baffle walls, which serve to extract most of the overspray mist entrained in the outflowing air. The liquid coating material is collected below the baffled discharge passage, adjusted as to proper viscosity if necessary, and reused. Desirably, the partially stripped air is then passed through a so-called liquid seal compressor system, as described in the beforementioned E. O. Norris U.S. Pat. No. 2,848,353, which serves to strip any remaining coating material or solvent mist from the air. To a large extent, the stripped air may be recycled through the system, with a sufficient amount of clean, uncontaminated air being discharged to the atmosphere to maintain the entire spray chamber area at a slight negative pressure relative to ambient.

In the illustrated system, the spray chamber 20 and entrance and exit vestibules are provided with a continuous, elongated slot 24 at the top, to closely receive hanger elements 11*a* extending from the load bar 12. Because of the slight negative pressure within the chamber, there tends to be a slight air inflow through the slot 24, substantially preventing the escape of solvent-laden air into the surrounding plant area.

As shown in FIG. 1, along each side of the spray housing 20 is a reciprocator station 26, 26'. The reciprocator stations are conventional, commercially available units, each carrying a mounting bar 27 arranged to be reciprocated vertically, sometimes through a fixed stroke and sometimes through a stroke of variable height, depending on the particular type of reciprocator drive. The mounting bar 27 carries a plurality of spray arms 28, which may be of the type disclosed in the beforementioned Wiggins application, the disclosure of which is made a part hereof by reference, and which extend through vertical slots 29 in the side walls 30 of the spray housing. Typically, the slots 29 are provided with an appropriate, flexible closure seal (not specifically shown) such that the spray housing remains substantially closed while accommodating the necessary vertical travel of the spray arms. It will be understood, of course, that the principles of the invention are applicable to systems utilizing one or more reciprocator systems, and the reciprocator stations may utilize one or more spray arms 28. In a typical case, however, where it is desired to spray coat relatively large, continuously moving parts, it is advantageous to utilize more than one spray arm on a reciprocator, and it is usually desirable to provide a reciprocator on each side of conveyor paths, in order to permit the workpiece to be coated on opposite sides in a single path through the spray housing. The reciprocator station 26 is movably mounted on tracks 31 so that the spray arms 28 can be adjustably positioned in the horizontal plane, along an axis perpendicular to the path of travel of the workpieces, as indicated by the arrow direction. In this manner, the spray arms 28 can be positioned in accordance with the width of the incoming workpiece 13 for optimum spraying.

Pursuant to the invention, the horizontal movement of the reciprocator station 26 is controlled by part width information stored in a novel part gaging apparatus, designated generally by the reference numeral 15. To advantage, the part gaging apparatus 15 may include a commercially available "Gemco" limit switch unit 16 in combination with a metal, part sensing element, which is preferably in the form of a plate 17 positioned adjacent the entrance vestibule 21. The "Gemco" unit is manufactured by the Gemco Electric Company of Clawson, Michigan 48017 and illustrated in Section 909 of the Gemco catalogue. The plate 17 is connected to laterally movable rod 18 of the "Gemco" unit 16 by means of a non-metallic block 19 fastened to the back of the plate 17. To insure proper contact between the plate 17 and any incoming workpiece, the height of the plate 17 is at least equal to the height of the highest workpiece which can be accommodated by the paint spray system.

A double-acting fluid cylinder 32 is mounted on the gaging unit 15 with its actuating rod 33 connected to the block 19, whereby activation of the cylinder 32 will effect movement of the plate 17. The paint spray system is provided with parallel connected photo cell sensors 34, the beams of which are interrupted by the leading edge of the incoming workpiece 13 to activate the cylinder 32 thereby advancing the plate 17 towards the workpiece 13. A flexible cable 35 is connected between the back of the plate 17 and forms part of the part gaging circuit, to be described in detail in Part II of this description.

As the plate 17 advances, the rod 18 is laterally displaced to sequentially actuate a series switching mechanisms housed in the "Gemco" unit by means of an arrangement of cams rotated on a common cam shaft mechanically linked to the rod 18. When the plate 17 makes contact with the workpiece, the part gaging circuit is energized via a loop closed through the cable 35, plate 17, workpiece 13, and conveyor arrangement to a ground connection 36. At this time, the part gaging circuit activates cylinder 32 to return the plate 17 to a retracted position and transmits a signal through the gaging unit 15 to an appropriate storage means to be described hereinafter in Part II.

Figure 2:
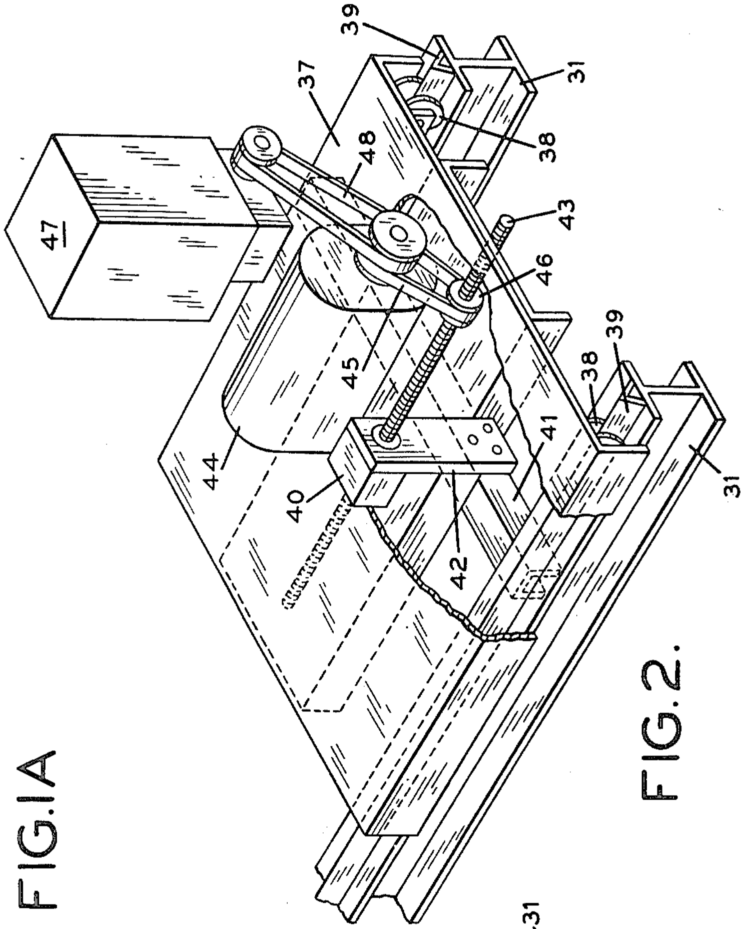
FIG. 2 is an elevational, perspective view of the power drive means for the spray head positioner of the invention.

Referring now to FIG. 2 there is shown a power drive means to effect the horizontal movement of the reciprocator station 26 along the tracks 31. The base 37 of the reciprocator 26 is provided with rollers 38 which ride on a wedge portion 39 of the track 31. Secured to the top portion of the base 37 is a electric motor 44 connected by a belt 45 and pulley 46 to the threaded shaft 43 of a Saginaw screw mechanism. Operation of the motor 44 will rotate the collar 46 and shaft 43 and thereby move the shaft relative to a fixed ball nut 40 to move the reciprocator base 37. Also mounted on the base 37 is a second "Gemco" limit switch unit 47, mechanically connected to the motor 44 by a belt 48. Operation of the motor 44 will sequentially actuate a second set of switching mechanism in the unit 47 in accordance with movement of the reciprocator base 37. The utilization of the part width information stored by the part gaging unit 15 and the control circuit for the motor 44 will be fully described in Part III, below.

As shown in FIG. 1, the trailing ends of the load bars 12 are advantageously provided with pins 54. Mounted on the conveyor 10 is a switch actuator 55 arranged to co-act with the pin 54 whereby switching contacts within the control circuit will be actuated to reset circuit elements in preparation for the incoming workpiece on the next load bar 12. In the event the last workpiece 14 on the load bar 12 extends beyond the trailing end of the load bar 12, the operation of the reset switching contacts will be delayed until the trailing end of the elongated workpiece 14 passes by the photo cell sensors 34, as fully described in Part III below.

Figure 1A:
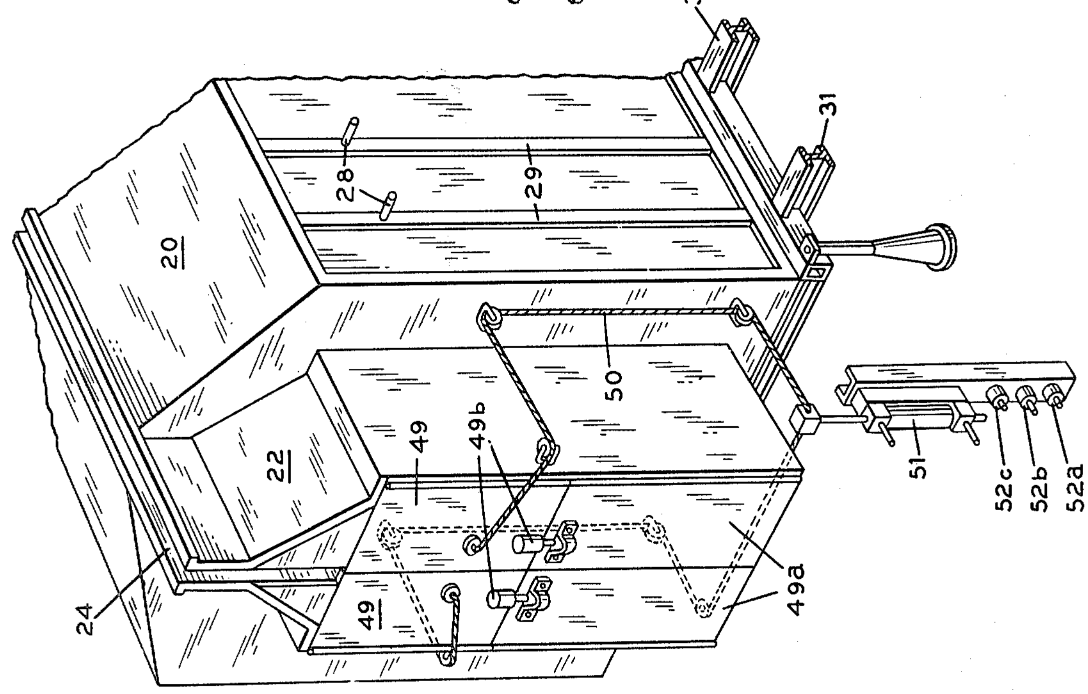

An automatic exit door arrangement is illustrated in FIG. 1*a* "Dutch" type exit doors 49, 49*a* are hingedly mounted to the exit vestibule 22 of the spray chamber 20. A cable-pulley system 50 interconnects the upper doors 49 to a double-acting fluid cylinder 51. The cylinder 51 is controlled by a circuit arrangement, to be fully described in Part IV, below, to open the doors when painted workpieces mounted on a load bar 12, are ready to exit the spray chamber 20 and to close the doors when the pieces have exited. Cylinder stops 52*a*–52*c* are selectively operated to co-act with the cylinder 51 in accordance with the width of the piece so that the doors 49 are opened just enough to allow the piece to exit.

Operation of the lower sections 49*a* of the "Dutch" type exit doors is controlled by a photo cell (FIG. 1). If the bottom of the workpiece extends below the lower edges of the upper doors 49 the workpiece will trigger the photo cell 53 before entering the spray chamber 20. This will activate the door latch cylinders 49*b* so that when the upper doors 49 are opened, the lower doors 49*a* will also be opened. The combination of "Dutch"-type doors 49, 49*a* and stop cylinders 52*a*–52*c* insures that the exit is large enough for the freshly coated workpiece to exit while at the same time minimizes the possibility of escape of solvent-laden air into the surrounding plant area.

II. Part Gaging Circuit

Figure 3:
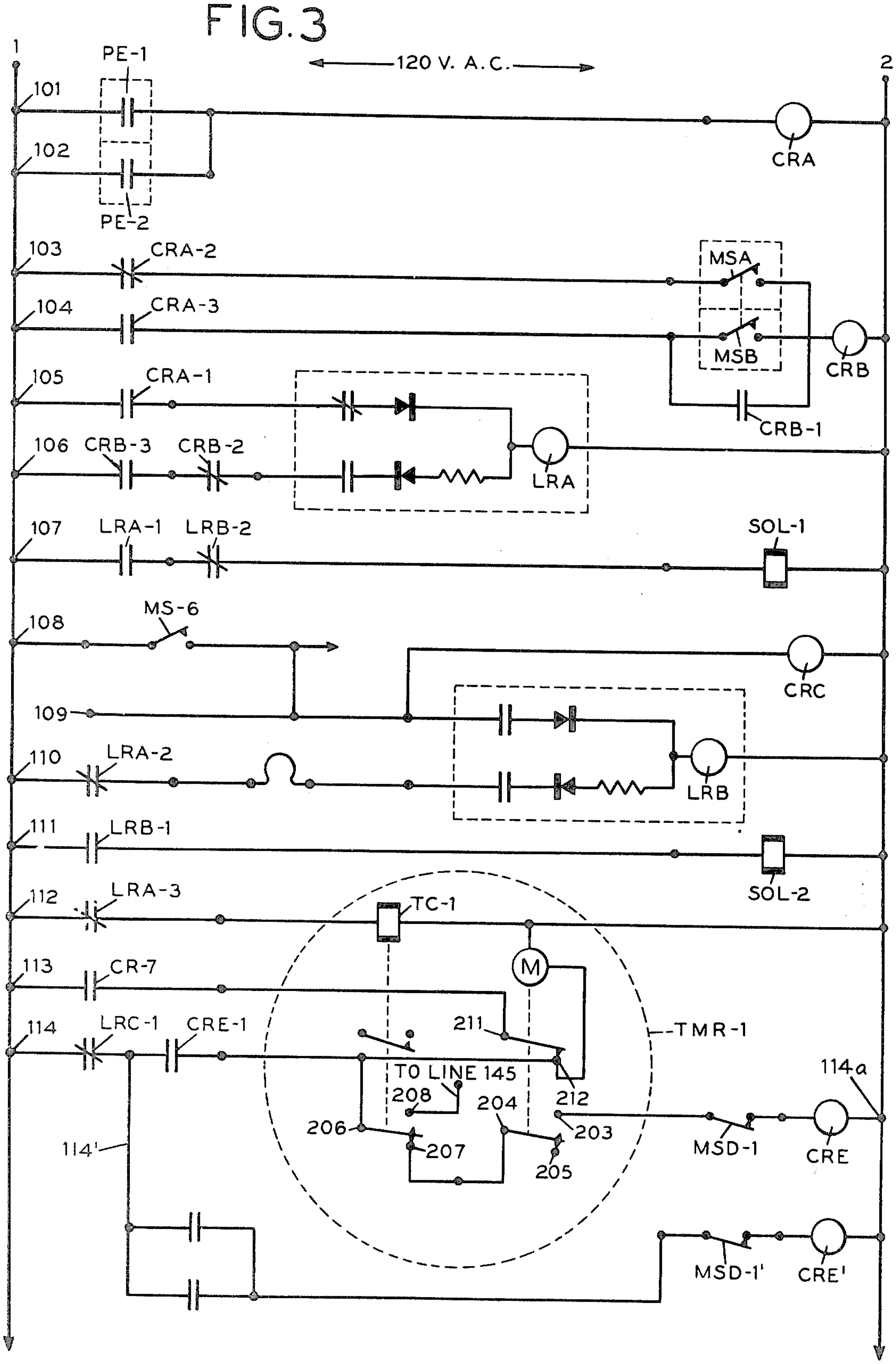
FIGS. 3 through 6 are simplified circuit diagrams for the electrical control for the conveyorized spray coating system of FIGS. 1 and 1*a*.

Referring now to FIG. 3, there is illustrated a schematic diagram for the part gaging circuit. This circuit includes main leads 1 and 2, which are connected to a suitable power source. As previously described, the incoming workpiece 13 will trigger the photo cells 34. Activation of one or both of the photo cells 34 will close one or both of the normally opened switches PE-1 or PE-2, (lines 101, 102) to energize relay CRA (line 101). The energized relay CRA will close normally opened contacts CRA-1 (line 105) to actuate a latch relay LRA. Latched relay LRA will close the normally-opened contacts LRA-1 (line 107) to energize a solonoid SOL-1, through normally-closed contacts LRB-2 and thereby activate the double-acting cylinder 32 to advance the contact plate 17 towards the incoming workpiece 13.

As described above, the advancing contact plate 17 will carry the rod 18 along with it to sequentially operate the switching mechanisms of the "Gemco" unit 16. The switching mechanisms are represented schematically in FIG. 5 as double-throw micro switches MS-1 to MS-5 operated in their normal position. In this manner, only one switch MS-1–MS-5 will be switched to its "Actuated" position at any one time. The next switch MS-1–MS-5 in the sequence will remain in its normal position until the plate 17 reaches a next predetermined forward position and will then be moved to its actuated position. The previously activated switch MS-1–MS-5 will be returned to its normal position. Each of the switches MS-1–MS-5 will therefore correspond to a predetermined forward position range of the contact plate 17. For example, MS-1–MS-5 may represent positions of the plate 17 between 12 to 6 inches from the center line of conveyor 10. In their normal positions, the switches are series connected, with the normally closed contact of each switch MS-1–MS-4 connected to the input contact of the next succeeding switch. The input contact of switch MS-1 is connected to the positive terminal of a 24 volt d.c. power supply (not shown).

Referring again now to FIG. 5 there is shown a wiring diagram for an arrangement of electrical memory devices which may advantageously be Allen-Bradley dry reed shift register units, as available commercially from the Allen-Bradley Company of Milwaukee, Wisconsin. The shift register units each comprise a storage stage, SR-1–SR-6 and an output stage, SR-7–SR-12. The illustrated schematic representation for each shift register is the standard wiring diagram as fully set forth in Instruction Bulletin 1612L of the Allen-Bradley Company. Each shift register unit SR-1–SR-7 to SR-6–SR-12 is connected to a 24 volt d.c. power supply by a COMMON LINE and NORMAL LINE. Information can be stored in the storage stages SR-1–SR-6 by applying a 24 volt d.c. signal to leads 62–67 respectively. The stored information is shifted from the storage stages SR-1–SR-6 to the output stages SR-7–SR-12 by opening the NORMAL LINE and closing a SHIFT LINE.

Pursuant to the invention, the position switches MS-1–MS-5 are arranged so that their normally opened contacts are each connected through normally opened relay contacts CRC-1–CRC-5 and leads 62–66 to the input contacts of the storage stage of Allen-Bradley shift registers SR-1 to SR-5, respectively. Thus, the signal storage of each shift register SR-1 to SR-5 will correspond to one of five predetermined forward position ranges of the contact plate 17. When the plate 17 makes contact with the workpiece 13, the cable 35 will complete a circuit from the ground connection 36. Through an amplifying relay (not shown) power is supplied to line 109 (FIG. 3), thereby actuating latch relay LRB and energizing relay CRC. At this time two events will take place. Actuated relay LRB will close its normally open contacts LRB-1 (line 111) to energize a solenoid SOL-2 and thereby activate the double-acting cylinder 32 to retract the contact plate 17. As a safety feature, a set of normally closed contacts LRB-2 (line 107) is opened by latched relay LRB to insure that SOL-1 will not be energized while the plate 17 is being retracted. Energized relay CRC will close its normally open contacts CRC-1 to CRC-5 and thereby permit the storage of the part width information in the appropriate one of the shift registers SR-1 to SR-5.

For example, assume the plate 17 advanced to a mid-position, 9″ from the center line of conveyor 10, before contacting the workpiece 13. Switch MS-3 will be activated to its normally open contact by the "Gemco" unit 16, completing a circuit from the positive terminal of the d.c. power supply through series connected normally de-actuated switches MS-1 and MS-2 and now-actuated switch MS-3 to the normally open contact. Energized relay CRC will have closed its normally-opened contacts CRC-3 and, therefore, the storage stage of shift register SR-3, corresponding to a third predetermined position range of plate 17, will be energized through lead 64. In a like manner, any of five predetermined forward position ranges of the plate 17 can be stored in shift registers SR-1 to SR-5 through the appropriately actuated switch MS-1 to MS-5, closed normally-open contact CRC-1 to CRC-5 of the relay CRC and lead 62–66. It can be readily appreciated that the forward position reached by the plate 17 will be appropriately related to the width of the workpiece 13 and thus correspond to the proper forward position of the reciprocator station 26.

In the event that the workpiece 13 is less than 12 inches wide, and therefore within 6 inches from the center line of conveyor 10, a sixth normally open, single throw switch MS-6 (line 108) is provided in the "Gemco" unit 16. The switch MS-6 will be closed by the "Gemco" unit 16 when the plate 17 reaches a forward limit position without workpiece contact and thereby actuate latch relay LRB to effect retraction of the plate 17 and energize the relay CRC. In this case, the switch MS-6 will close while the switch MS-5 is still in its actuated position, so that part width information will be stored in the storage SR-5 and the reciprocator 26 will be controlled to advance to its fifth predetermined forward position, as will be described in part III below.

III. Reciprocator Control Circuit

Figure 4:
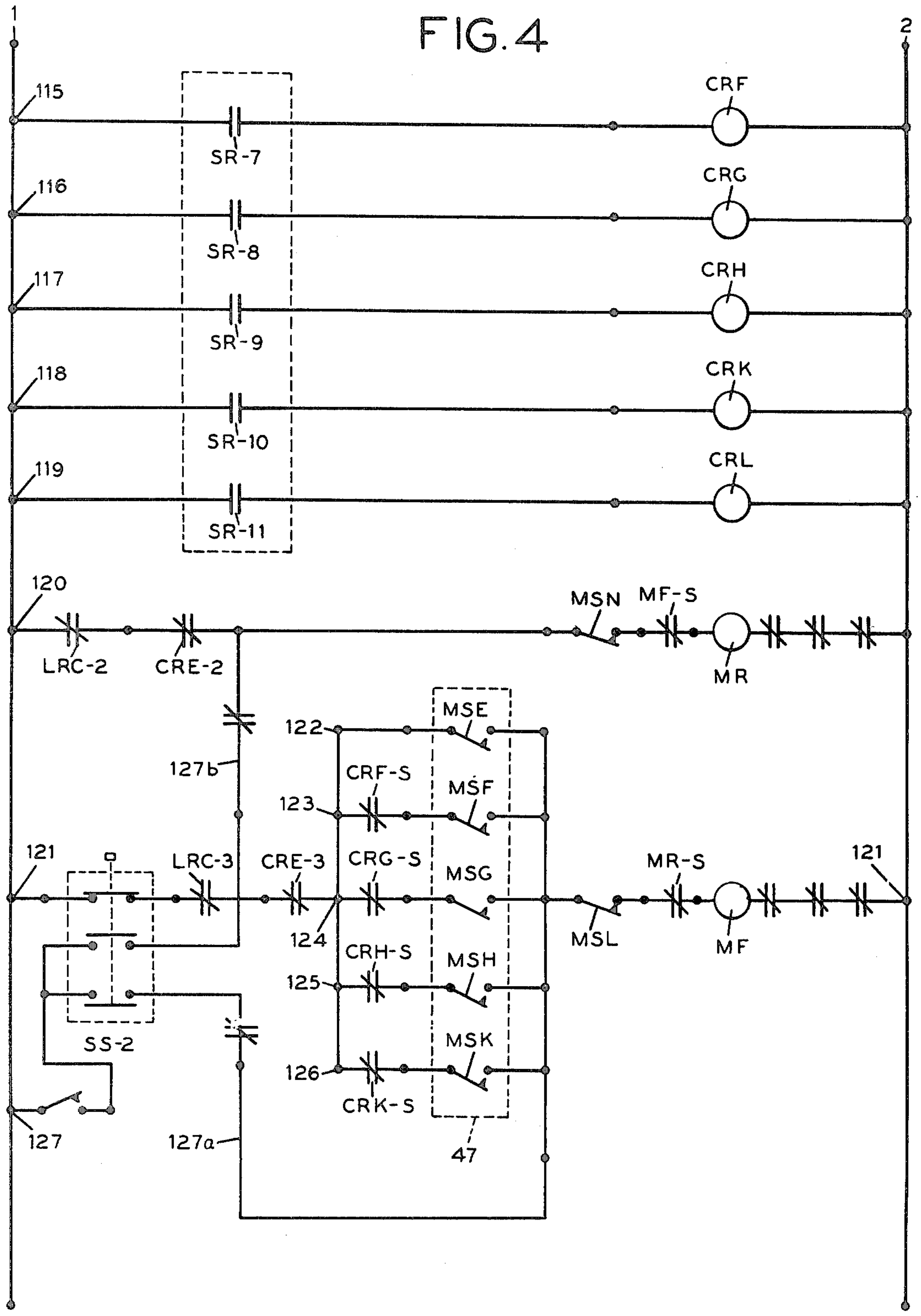

Once the part gaging unit 15 has operated to store part width information in the storage of the appropriate shift register SR-1–SR-5, the motor 44 can be energized to properly position the reciprocator 26. Referring now to FIGS. 3 and 4, there is shown a schematic for the Reciprocator Control Circuit. This circuit also includes main leads 1 and 2, which are connected to the main power supply.

Pursuant to the invention, line 112 of the circuit is inter-connected with the clutch coil TC-1 of a timer TMR-1. To advantage, the timer can be a commercially available HP5-01 "Cycl-Flex" timer, the standard schematic symbol for which is shown within the dashed circle. The timer is manufactured by the Eagle Signal Division of Gulf & Western Industries, Inc. of Davenport, Iowa. When the timer TMR-1 is in a "reset" condition the contacts 204–205, 206–208 and 211–212 will be closed and the contacts 204–203 amd 206–207 will be opened. The timer TMR-1 is set to time by opening of the normally-closed contacts LRA-3 (line 112) to de-energize the clutch coil TC-1 within the timer unit to start timing. The contacts LRA-3 are opened by energization of latch relay LRA at the commencement of the part gaging cycle, as described above.

During the timing phase of the timer TMR-1, the contacts 204–203 remain open, contacts 211–212 remain closed and contacts 206–207 are closed. The timer TMR-1 is set to time out when the incoming workpiece 13 has been gaged and is approaching the first reciprocator spray means in the spray chamber 20. When TMR-1 times out, timer contacts 206–207 remain closed, contacts 204–203 will close and contacts 211–212 will open after a time delay. The normally open relay contacts CR-7 (line 113) are closed as long as the conveyor is operating. Consequently, relay CRE (line 114*a*) will be initially energized at time out, through line 113, and thereby close its normally open contacts CRE-1 (line 114). After timer contacts 211–212 open, relay CRE will continue to be energized through line 114 through closed contacts CRE-1, normally closed contacts LRC-1 closed timer contacts 206–207 and 204–203 and normally closed limit switch MSD-1, until the reciprocator 26 is properly retracted to a home position.

Retraction of the reciprocator 26 is effected by the motor 44, energized through a motor reverse relay MR. (line 120, FIG. 4). Energized relay CRE (line 114*a*) will close normally-open contacts CRE-2 to complete the circuit of line 120 through the normally closed relay contacts LRC-2 and MFS and a normally closed limit switch MS, to energize its relay MR. Relay MR will actuate the motor 44 to operate a reverse mode. As a safety feature, relay CRE will open its normally closed contacts CRE-3 (line 121) and relay MR will open normally closed contacts MR-S (line 121) so that the motor 44 cannot be activated to operate in its forward mode while it is retracting the reciprocator 26.

When the reciprocator 26 reaches its "home" position it will open a normally-closed limit switch MSD1 (line 114*a*) to de-energize relay CRE, and thereby close the contacts CRE-3 (line 121) and re-open contacts CRE-2, (line 120) to stop the motor 44. The normally closed limit switch MSN is also provided in the line 120. It will be opened by the reciprocator 26 in a "full retract" position which is reached through a manual mode of operation in order to remove the spray nozzles from the spray chamber.

Figure 5:
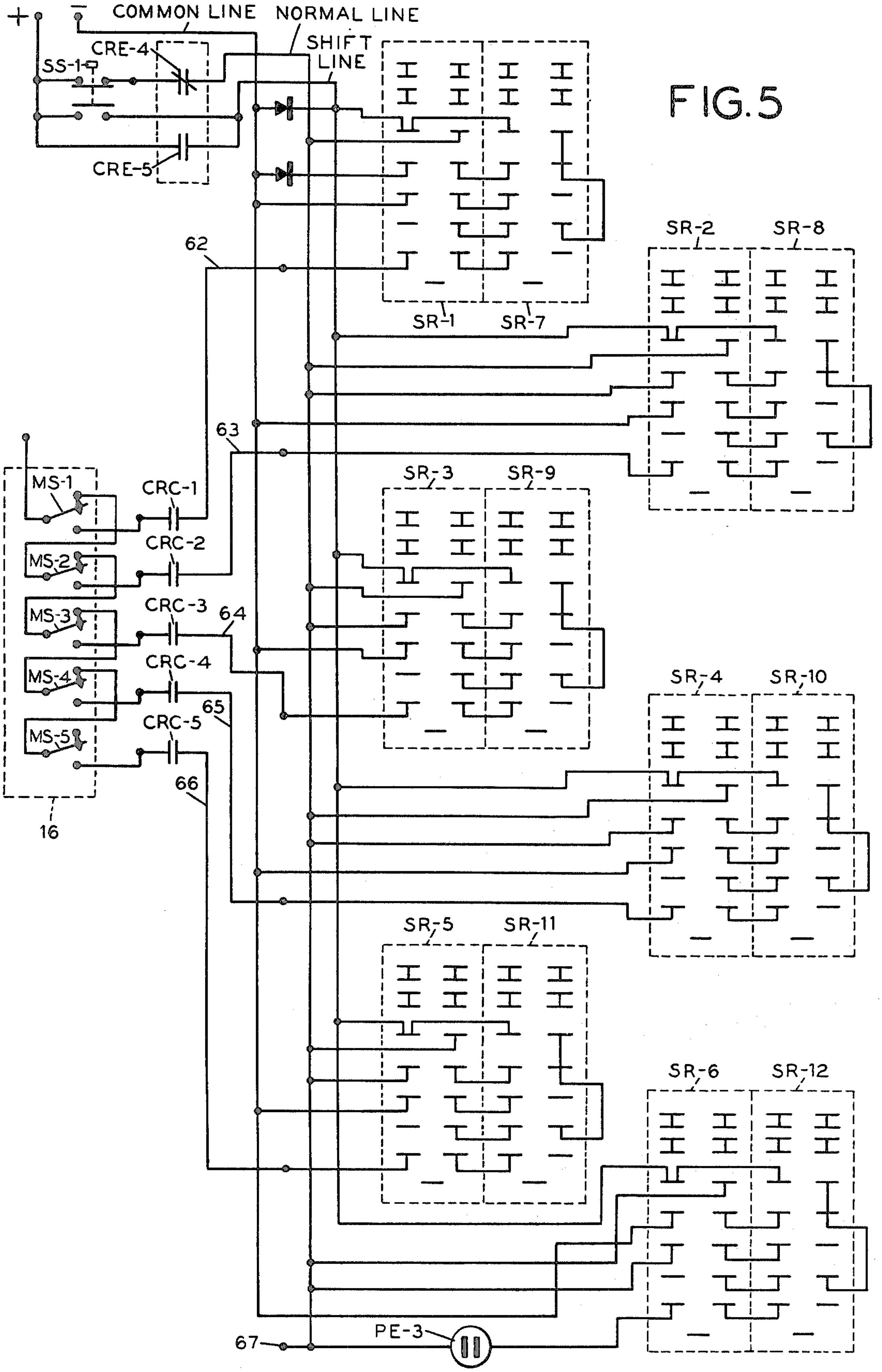

To particular advantage, energized relay CRE will also open the normally closed contacts CRE-4 (NORMAL LINE) and close the normally open contacts CRE-5 (SHIFT LINE) FIG. 5 to shift the part width information stored in the storage stage of the appropriate shift register SR-1–SR-5 to its corresponding output stage SR-7–SR-11. Switch SS-1 is provided to effect a manual shift, if desired. The output stages SR-7–SR-11 are arranged so that complimentary normally opened contacts in lines 115–119 (FIG. 4) will be closed, if information is present in the shift register output, to energize one of the relays CRF–CRL.

Pursuant to the invention, the motor 44 is energized to operate in a forward mode through line 121 which is divided into a parallel circuit (lines 122–126) and then re-combined into a single line. A three position switch SS-2 is operable to close line 121 (auto) or effect a manual forward or return operation of the motor 44 through lines 127*a* or 127*b*. Normally the switch SS-2 is set in the auto mode, as illustrated. The series of limit switches MSE-MSK (lines 121–125) represent the switching mechanism of the second or "slave" "Gemco" unit 47, which is mechanically linked to the motor 44 by belt 48, as described above. When the reciprocator 26 reaches its home position, the switch MSE will be closed by the "Gemco" unit 47 and a "forward" signal for the motor 44 is transmitted through the lines 121–122 to energize the relay MF. Energized MF will actuate the motor 44 to advance the reciprocator 26 to a forward position, and open the normally-closed contacts MF-S (line 120) to prevent the relay MR from being energized while the motor 44 is operating in the forward mode.

As the motor 44 continues to operate in the forward mode it will drive the "Gemco" unit 47 to sequentially close, in a make before brake sequence, the normally open limit switches MSF-MSK. Therefore, the relay MF will be continuously energized through line 121 and sequentially through lines 123–126, provided the normally closed contacts CRF-S to CRK-S are closed.

As previously described, the outputs of the shift registers SF-7–SR-10 are arranged to energize relays CRF–CRK (lines 115–119) if they contain part width information. If, for example, the storage of shift register SR-3 has been energized by the plate-workpiece contact, when energized relay CRE is actuated to effect an information shift, as described hereinabove, the complimentary output SR-9 is energized, and therefore relay CRH (line 117) is activated. This will open the normally closed contacts CRH-S (line 125). When the switch MSH is closed by the "Gemco" unit 47 in its normal sequence, the power to energize relay MF will be cut off by the open contacts CRH-S and the motor 44 will stop operating with the reciprocator 26 in its "proper" forward position. In a similar manner outputs SR-7–SR-10 will operate to stop the motor 44 at the appropriate forward position when they contain part width information.

A second reciprocator 26' may be positioned on the opposite side of the spray chamber 20 and controlled by an identical circuit arrangement, as just described (not shown). For this purpose, line 114' is connected to line 114 to energize relay CRE' when the timer TMR-1 times out. Energized relay CRE' will act to control the second reciprocator 26' in the same manner as relay CRE controls the reciprocator 26.

In the event that part width information is stored in the shift register SR-5, corresponding to the fifth forward position of the reciprocator 26, the output stage shift register SR-11 will be energized upon the information shift. The information at the output register SR-11 will energize relay CRK, forming part of the exit door control circuit, to be described below in Part IV. In this case the reciprocator 26 will be driven by the motor 44 until the "Gemco" slave unit 47 closes the normally open switch MSK (line 126). The motor 44 will continue to be energized through line 121–126 until a sixth, normally-closed switch MSL-1 (line 121) in the "Gemco" unit 47 is opened to interrupt power to the motor 44 at the fifth forwardmost position.

Figure 6:
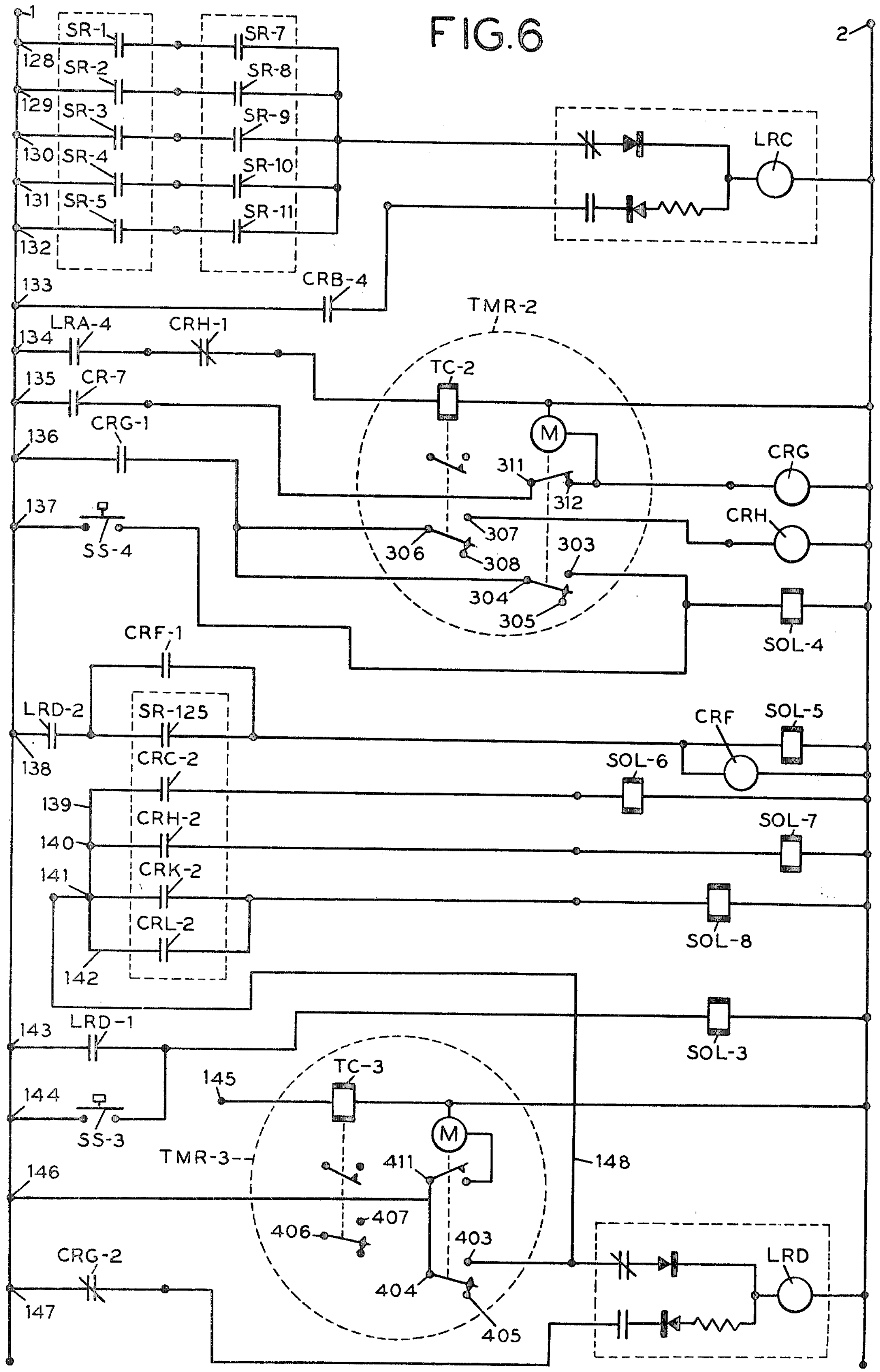

In accordance with another feature of the invention, the reciprocator 26 will not be repositioned if the width of the incoming workpiece requires the same forward position as the workpiece previously gaged. A normally open contact in each of the storage stages SR-1 to SR-5 is connected in series with a normally open contact in each of the output stages SR-7 to SR-11 (lines 128–132), as illustrated in FIG. 6. When the part gaging circuit energizes the storage stages SR-1–SR-5, corresponding to the proper forward position of the incoming piece it will close the normally open contact (lines 128–132) for that storage stages SR-1–SR-5. The output stages SR-7–SR-11 from the previous part gaging cycle will still be energized (the output is erased upon the information shift) and consequently its complimentary normally opened contact (lines 126–130) will also be closed. In the event there is a match, the circuit through the corresponding line 128–132 will be closed to actuate the latch relay LRC.

The latched relay LRC will open its normally closed contacts LRC-2 (line 120) and LRC-3 (line 121) to defeat energization of the motor controlling relays. Moreover, the normally closed switch LRC-1 (line 114) will be opened to de-energize relay CRE when timer contacts 211–212 (time delay open) of the timer TMR-1 open. Therefore, relay CRE will be energized just along enough at time out of timer TMR-1, through line 113, to effect an information shift, as described hereinabove.

When the workpiece 13 enters the spray chamber 23 the reciprocator 26 will be properly positioned and the spray heads, which are continuously spraying, will be in an optimum relationship with the workpiece. Eventually, the pin 54 on the trailing edge of the load bar 12 will hit the plunger 55 to de-latch relays LRA, LRB and LRC and reset the timer TMR-1 so that the part gaging and positioning cycle described above can be repeated for a next incoming load bar 12. The plunger 55 is arranged to momentarily close normally open switches MSA and MSB (lines 103, 104). The relay CRB will, therefore, be energized through line 103.

In the event the workpiece 14 is longer than the load bar 12, the switches PE-1, PE-2 will be held closed by the action of the photo cells 34 which will still "see" the workpiece and the relay CRA will have been energized. Thus, the relay contacts CRA-2 will be open and the contacts CRA-s will be closed. Relay CRB will thus be energized through line 104, closing its normally open contacts CRB-1 to hold CRB in an energized state as long as the workpiece interrupts the beam of the photo cells 34 and maintains relay CRA energized.

Energized relay CRB will open its normally closed contacts CRB-2 and close its normally-open contacts CRB-2 (line 106). When the relay CRB is subsequentially de-energized, either by opening of the switch MSA (as the pin 54 passes the plunger 55) or by the de-activation of the photo cells 34 (by passing of a long workpiece 14), relay contacts CRB-2 will close and the contacts CRB-3 will open after a time delay. The latch relay LRA will be de-latched through line 106 before the contacts CRB-3 re-open.

When the latch relay LRA is delatched, its contacts LRA-2 (line 110) will assume a normally closed position and de-latch the relay LRB through line 110. The energized relay CRB will also close the normally open contacts CRB-4 (line 133) to de-latch the relay LRC in the event it had been activated by a part width match (lines 128–132), as discussed above. Finally, the delatched relay LRA will re-close its normally closed contacts LRA-3 (line 112) to reset the timer TMR-1.

IV. Exit Door Control Circuit

Referring to FIG. 6 there is illustrated the circuit for automatically opening and closing the exit doors 49. The "Cycle-Flex" timer TMR-3 is arranged to actuate latch relay LRD to close normally open contacts LRD-1 (line 143) and thereby energize the solenoid SOL-3. The solenoid SOL-3 will activate the two way cylinder 51 to pull the cable system 50 and open the upper exit doors 49.

To advantage, the timer TMR-3 is set to start at the same time as the timer TMR-1 and times out when the conveyor 10 has brought the workpiece 13 to the exit vestibule 22. To accomplish this the line 145 is cross-connected to timer contact 208 of the timer TMR-1. The timer contacts 206–208 and 211–212 of the timer TMR-1 are normally closed when the "Cycle-Flex" timer is in reset, and therefore the clutch TC-3 of the timer TMR-3 will be energized through lines 113, contact 211–212 and 206–208 of the timer TMR-1 and the line 145. When the timer TMR-1 is set for timing, the contacts 206–208 are opened and the clutch TC-3 of the timer TMR-3 is de-energized to start the timer TMR-3 timing.

When the timer TMR-3 is timing, the contacts 411–412 will be closed and contacts 404–403 will be opened. At time-out the timer contacts 404–403 will close and the contacts 411–412 will open after a time delay. The latch relay LRD will be actuated through line 146 before the contacts 411–412 open. Latched relay LRD will close its normally open contacts LRD-1 (line 143) after a time delay to energize the solenoid SOL-3 and thereby activate the two-way cylinder 51 to open the upper exit doors 49. The solenoids SOL-3 may also be activated normally by closing the switch SS-3 (line 144).

To advantage, the latched relay LRD will immediately close the normally open contacts LRD-2 (line 138) to activate the latches 54 to fasten the lower doors 49*a* to the upper doors 49, if the workpiece is too large to exit with only the upper doors opened. In this regard, a vertically elongated workpiece will interrupt the beans of the photo cell 53 (FIG. 1). This will close the normally open switch PE-3, in the line 67 to the storage register SR-6, to store the part height information therein as illustrated in FIG. 5. When the energized relay CRE (line 114*a*) effects the information shift, through contacts CRE-4 and CRE-5, the output register SR-12 will close the normally-open switch SR-12S (line 138). The closed switch LRD-2 will then complete the circuit through line 138 to activate the solenoid SOL-5 and thereby close the door latches 49*b*. The relay CRF will also be energized by line 138, closing its normally open contacts CRF-1 so that the door latches 49*b* remain closed until the latch relay LRD is delatched to open its contacts LRD-2 after the doors 49 have been closed, as will be described below.

When the timer TMR-3 times out, it will also complete a circuit through line 148 to the lines 139–142. If the part width information is contained in any of the shift register outputs SR-8–SR-11, corresponding to the second through fifth forward positions of the reciprocator 26, respectively, one of the relays CRG–CRL (lines 116–119) will be energized. This in turn, will close one of the normally open sets of relay contacts CRG-2–CRL-2 (lines 139–142) to activate one of the solenoids SOL-6–SOL-8. The solenoids SOL-6–SOL-8 advance one of the stop plungers 52*a*–52*c* respectively, (FIG. 1*a*) to stop the cylinder 51 and thereby only allow the exit doors 49 to open just wide enough to allow the exit of the gaged workpiece. If the part width information is in shift register output stage SR-7, (the widest part), no stop will be advanced and the doors 49 will open all the way.

Closing of the doors is effected by means of a timer TMR-2 (lines 134–137). The normally open relay contacts LRA-4 (line 134) will be closed when the latch relay LRA is actuated in the part gaging cycle, described above. This will reset the timer TMR-2 from time-out of the previous cycle. When the relay LRA is delatched by the de-energization of the relay CRB as described above, the contacts LRA-4 will be re-opened to de-energize the clutch TC-2 of the timer TMR-2 and start it timing. The timer TMR-2 will time out when the conveyor 10 has transported the trailing edge of the workpiece 14 or load bar 12, which ever is longer past the exit doors 49.

At time out, the timer contacts 304–303 will close and contacts 311–312 will open after a time delay. Before the timer contacts 311–312 open, the relay CRG will remain energized and its contact CRG-1 will be closed (line 136) to complete the circuit through the timer contacts 304–303 to energize the solenoid SOL-4. The solenoid SOL-4 will activate the two-way cylinder 51 to close the exit doors 49.

When the timer TMR-2 is set for timing, its contacts 306–307 will close to energize the relay CR-H. Energized relay CR-H will open the normally closed contacts CRH-1 (line 134) so that the relay contacts LRA-4 cannot operate to reset the timer TMR-2 until it has timed out and performed its proper function. When the timer TMR-2 times out and its contact 311–312 open the relay CRG will be de-energized and contacts CRG-1 will open, after a time delay, and thereby de-energize the relay CRH to close contacts CRH-1. The timer TMR-2 can then be reset by the closing of contacts LRA-4. The timer contacts 306–307 will be opened when the timer TMR-2 is reset. When the contacts 311–312 of the timer TMR-2 open, the relay CRG will de-energize and contacts CRG-2 (line 147) will return to a normally closed position to de-latch the relay LRD.

Switch contacts CR-7 (line 135) are provided as a safety feature and will always be closed as long as the conveyor 10 is operating properly. A switch SS-4 (line 137) is provided to effect a manual close of the doors 49, if desired.

V. Summary of Operation

The illustrated form of the present invention affords a highly reliable part gaging and spray head positioning system. The conveyor 10 can transport a plurality of load bars 12, each mounting one or more workpieces, through the spray housing 20 and thereby process a large number of workpieces. The leading edge of a first workpiece 13 on each load bar 12 activates the photo cells 34 to advance the double-acting fluid actuator 32 and thereby displace the contact plate 17 torwards the workpiece 13.

As the contact plate 17 is displaced, it will operate the limit switch unit 16 by pulling the rod 18. The operation of the limit switch unit 16 will sequentially actuate, one at a time, the plurality of double-throw switches MS-1 to MS-5 (FIG. 5) (housed in the limit switch 16) from a normal position to an actuated position. In this manner, only one switch MS-1–MS-5 will be actuated at a time, and each will correspond to a predetermined position range of the contact plate 17. The switch MS-1 and MS-5 are arranged so that when they are in the actuated position they are connected to the input lead of one of the storage registers SR-1 to SR-5 through a normally opened contact CRC-1–CRC-5.

When the contact plate 17 makes physical contact with the workpiece 13, the part gaging circuit will be activated by a closed electrical path through the cable 35, plate 17, workpiece 13 and conveyor system to the ground connection 36. The activated circuit will effect retraction of the double-acting cylinder 32 to displace the contact plate from the workpiece 13, and close the normally-opened contacts CRC-1 to CRD-5, as fully described above, in Part II. At the point of workpiece contact only one limit switch MS-1 to MS-5, corresponding to the forward position occupied by the plate 17 at contact, will be actuated and the activated part gaging circuit will effect energization of one of the storage stages SR-1 to SR-5 through the actuated switch MS-1 to MS-5. Consequently, each of the storage stages SR-1 to SR-5 will correspond to one of the predetermined forward positions represented by the switches MS-1 to MS-5 and only the storage stage SR-1 to SR-5 connected to the actuated switch MS-1 to MS-5 will be energized. Therefore, information approximately related to the width of the incoming workpiece and corresponding to the proper forward position of the positioner 26 will be stored in one of the storage stages SR-1–SR-5.

The delay timer TMR-1 will also be set upon activation of the photo cells 34 by the leading edge of the incoming workpiece 13. The timer will time out when the conveyor 10 has transported the workpiece 13 to the first spray gun in the spray housing 20. At this time, the previous load bar 12 will be exiting the housing 20. As described above in Part III, the control circuit for the reciprocator 26 is then energized at time-out of the timer TMR-1 to retract the reciprocator 26 to a "home" position from which it can be advanced to a new forward position in accordance with the stored information for the new incoming workpiece 13.

To particular advantage, the control circuit will operate the motor controlling relay MF, to energize the forward or search mode of the motor 44, through a parallel electric feed arrangement. Each leg of the feed circuit (lines 122–126 of FIG. 4) comprises a normally-open limit switch MSE-MSR of the slave limit switch unit 47 in series with a normally-closed electrical contact CRF-S to CDK-S. The slave limit switch unit 47 is mechanically connected to the motor 44 whereby operation of the motor 44 will effect a sequential closing of the limit switches MSE to MSK, one at a time, in a make-before-brake sequence. In this manner, each closed limit switch MSE to MSK will correspond to a predetermined forward position of the reciprocator 26.

The time-out of the timer TMR-1 will effect an "information shift" whereby the energized storage stage SR-1 to SR-5, containing the part width information, will energize its complimentary output state SR-7 to SR-10, as described in Part III, above. Thus, each output stage SR-7 to SR-10 will represent a predetermined forward position of the reciprocator. The output stages SR-7 to SR-10 are arranged to activate a complimentary relay CRF to CRK (lines 115 to 119 of FIG. 4.) The relays CRF to CRK in turn, are mechanically linked to the normally-closed contacts CRF-S TO CRK-S, respectively, of the parallel feed circuit. These each contact CRF-S to CRK-S will correspond to the predetermined forward position of the reciprocator 26 represented by the complimentary output stage SR-7 to SR-11. The contacts CRF-S to CRK-S are each series-connected with the limit switch MSE to MSK corresponding to the same predetermined forward position of the reciprocator 26.

After the information shift, the one energized output stage SR-7 to SR-10 will activate its complimentary relay CRF to CRK to open the corresponding contact CRF-S to CRK-S. In the operation of the system, the motor actuating relay MF will be energized sequentially through the parallel feed circuit as the slave limit switch unit 17 closes the limit switches MSE to MSK one at a time. When the limit switch MSE to MSK corresponding to the proper forward position of the reciprocator is closed, the now opened contact CRF-S to CRK-S will interrupt the power to relay MF thereby stopping the motor 44.

As another feature of the present invention, the novel reciprocator control circuit is provided with a workpiece width comparison circuit (lines 128–132 of FIG. 6) to defeat repositioning of the reciprocator 26 if the width of a new incoming workpiece 13 is the same as the workpiece previously gaged. In accordance with this aspect of the invention, the storage stage SR-1 to SR-5 energized by the part gaging apparatus 15 is "matched" with the complimentary output stage SR-7 to SR-11. If the output stage SR-7 to SR-11 is also energized, i.e. if the previous part had the same width, these will be a match and the reciprocator control circuit will be de-energized, thereby maintaining the reciprocator 26 in the same position.

After the part gaging and reciprocator positioning cycles have been completed, the conveyor 10 will be transporting the workpieces 13, 14 through the spray housing 20 and the trailing edge of the load bar 12 will be just about to enter the entrance vestibule 21. At this time the pin 54 will trip the plunger 55 (FIG. 1) to reset the timer TMR-1 and part gaging circuit so that the new leading workpiece 13 of the next incoming load bar 12 can initiate a new part gaging and reciprocator positioning cycle in accordance with the width of the new workpiece 13. Moreover, as fully described in Part IV above, the timers TMR-2 and TMR-3 will time out as the previous load bar 12 approaches the exit doors 49, 49*a* to activate the exit door control circuit in accordance with the width of the workpiece 13.

With its may features, the present invention provides an entirely practical and efficient system for part gaging and paint spray head positioning. Moreover, while the invention is not exclusively limited to such use, it is extraordinarily advantageous when used in combination with the rotating, reciprocating spray heads of the beforementioned Wiggins Application in a recirculating overspray recovery system of the general type described in the E. O. Norris U.S. Pat. No. 2,848,353. With this system, the spray material may be applied substantially without regard to the amount of overspray (spray material not contacting the workpiece) inasmuch as such spray material is collected and recycled. The combination of the properly positioned rotating, reciprocating spray heads, in conjunction with the recirculating and overspray collection system, is outstandingly advantageous for the spray coating of workpieces in which there is a considerable amount of open work, for example, or where the general configuration of the part is highly irregular from place to place such that a reciprocating stroke adequate for some portions of the workpiece would tend to be excessive for others.

As will be readily appreciated, the specific forms of the invention herein illustrated and described are representative only, as certain variations may be made therein without departing from the clear teachings of the disclosure. Accordingly, reference would be made to the following appended claims in determining the full scope of the invention.

I claim:

1. In a paint spray system, comprising a spray housing including an exit door arrangement and means for conveying a workpiece through said housing, and apparatus for automatically opening said exit door, which comprises (a) detecting means adjacent said housing to detect the presence of said workpiece in response to said conveying means conveying the workpiece to the housing, (b) first delay timer means operatively connected to said detecting means whereby activation of said detecting means by the presence of the workpiece at said housing activates said first delay timer means, (c) said first delay timer means being operable to time out at the end of the time period necessary for said conveying means to convey the workpiece to said exit door, and (d) actuator means mechanically connected to said exit door arrangement and operationally connected to said first delay timer whereby at time-out of said first delay timer means said actuator means will operate to open said exit door arrangement.

2. The apparatus according to claim 1, further characterized by (a) a second delay timer means operatively connected to said detecting means whereby the deactivation of said detecting means by said conveying means conveying the workpiece past said detecting means and into said housing activates said second delay timer means, (b) said second delay timer means being operable to time out at the end of the time period necessary for said conveying means to convey the workpiece out of said housing, and (c) said second timer being operationally connected to said actuator means whereby, at time out of said second delay timer means, said actuator means will operate to close said exit door arrangement.

3. In a paint spray system comprising a spray housing including an exit door arrangement and means for conveying a workpiece through said housing, an apparatus for automatically opening said exit door arrangement, which comprises (a) actuator means connected to said exit door arrangement, and (b) storage means containing part dimension information of said workpiece being conveyed and operationally connected to said actuator means, (c) said actuator means operable upon said conveying means transporting said workpiece to said exit door arrangement and co-acting with said storage means to open said exit door arrangement in accordance with the part dimension information stored in said storage means whereby said exit door arrangement is opened to a size of opening corresponding to the dimensions of said workpiece.

4. The paint spray system according to claim 3, further characterized by (a) said exit door arrangement comprising at least one outwardly opening door hingedly mounted on said housing, (b) a plurality of selectively operable stop action means to co-act with said actuator means and variably limit the amount of opening of said hingedly mounted door, (c) said storage means being operationally connected to each of said stop-action means whereby said storage means will activate one of said stop-action means in accordance with the part dimension information stored therein, thereby opening said door wide enough to allow the workpiece to exit said housing.

5. The paint spray system according to claim 3, further characterized by (a) said exit door arrangement comprising a door hingedly mounted on said housing including an upper portion and a lower portion, (b) said actuator means being mechanically connected to said upper portion, (c) selectively operable latching means interconnecting said upper portion and said lower portion, and (d) means to measure the height dimension of said workpiece operationally connected to said latching means whereby if the height dimension of said workpiece is greater than said upper portion, said means for measuring the height dimension of said workpiece will activate said latching means.

6. In a paint spray system, comprising a spray housing including an exit door arrangement and means for conveying a workpiece through said housing, an apparatus for automatically opening said exit door, which comprises (a) detecting means adjacent said housing to detect the presence of said workpiece upon said conveying means conveying the workpiece to the housing, (b) first delay timer means operatively connected to said detecting means whereby activation of said detecting means by the presence of the workpiece at said housing activates said first delay timer means, (c) said first delay timer means being operable to time out at the end of the time period necessary for said conveying means to convey the workpiece to said exit door, and (d) actuator means mechanically connected to said exit door arrangement and operationally connected to said first delay timer whereby at time-out of said first delay timer means said actuator means will operate to open said exit door arrangement, (e) said exit door arrangement comprising a pair of opposed, outwardly opening doors hingedly mounted on said housing, (f) storage means containing part width information of said workpiece being conveyed, and (g) a plurality of selectively operable stop action means to co-act with said actuator means and variably limit the amount of opening of said exit door arrangement, (h) said storage means being operationally connected to each of said stop action means whereby said storage means will activate one of said stop action means in accordance with the part width information stored therein, thereby opening said doors wide enough to allow the workpiece to exit.

7. In a paint spray system, comprising a spray housing including an exit door arrangement and means for conveying a workpiece through said housing, an apparatus for automatically opening said exit door, which comprises (a) detecting means adjacent said housing to detect the presence of said workpiece upon said conveying means conveying the workpiece to the housing, (b) first delay timer means operatively connected to said detecting means whereby activation of said detecting means by the presence of the workpiece at said housing activates said first delay timer means, (c) said first delay timer means being operable to time out at the end of the time period necessary for said conveying means to convey the workpiece to said exit door, and (d) acutator means mechanically connected to said exit door arrangement and operationally connected to said first delay timer whereby at time-out of said first delay timer means said actuator means will operate to open said exit door arrangement, (e) said exit door arrangement comprising a door hingedly mounted on said housing and including an upper portion and a lower portion, (f) said actuator means being mechanically connected to said upper portion, (g) selectively operable latching means interconnecting said upper portion and said lower portion, and (h) said detecting means including means to respond to the height of said workpiece and operationally connected to said latching means whereby if the height of said workpiece is greater than said upper portion said detecting means will activate said latching means.

* * * * *